No. 615,468. Patented Dec. 6, 1898.
C. YEAGER.
POT OR KETTLE STRAINER.
(Application filed Apr. 25, 1898.)
(No Model.)
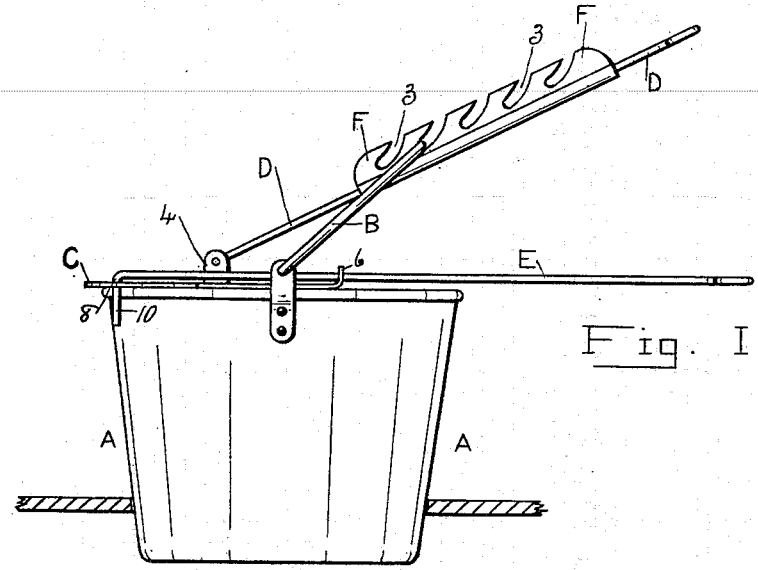
Fig. I.
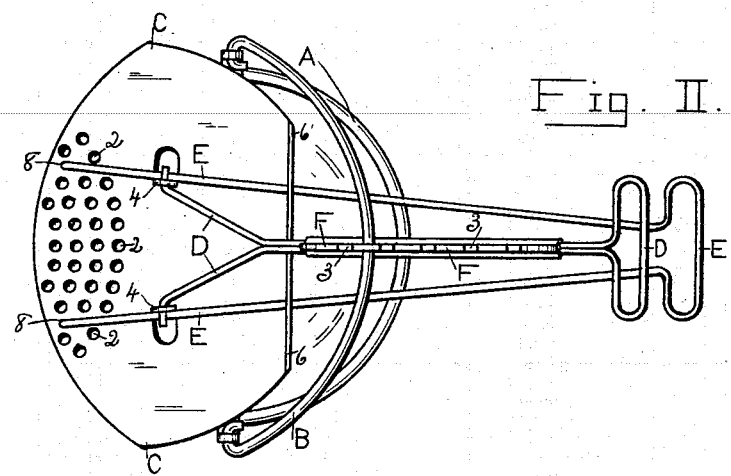
Fig. II.
Witnesses.
B. E. Herald
A. McKeesan
Inventor.
Charles Yeager
By John K. Hendry
Atty.

UNITED STATES PATENT OFFICE.

CHARLES YEAGER, OF HAMILTON, CANADA.

POT OR KETTLE STRAINER.

SPECIFICATION forming part of Letters Patent No. 615,468, dated December 6, 1898.

Application filed April 25, 1898. Serial No. 678,691. (No model.)

*To all whom it may concern:*

Be it known that I, CHARLES YEAGER, a citizen of Canada, residing at Hamilton, in the county of Wentworth, in the Province of Ontario, Canada, have invented a new and useful Pot or Kettle Strainer, of which the following is a specification.

This invention relates to a new and useful device consisting of a metallic plate of suitable shape to cover the fore or pouring-out part of a pot or kettle and having a number of apertures in the fore part for straining purposes, said plate provided with suitable handles for manipulating and holding the pot to various angles while straining and also for carrying the pot.

This specification discloses the most approved form and design of my invention, while the claims define the actual scope of the conception.

Reference is to be had to the accompanying drawings, forming a part of this specification, in which similar characters of reference refer to similar parts throughout both views.

In the drawings, Figure 1 is a side elevation of the device as seen in position on a pot or kettle and ready for manipulation by means of its handles, which form a very important part thereof. Fig. 2 is a plan of the same. These two views embody my invention.

The pot or kettle is indicated by the letter A, and its bail or handle by B. It will be perceived that the fore part of the pot, or that part which is used for pouring out, is sufficiently covered by a light metallic plate C, having a number of apertures 2 in the fore part thereof for straining purposes. The said pot is tipped forward when straining by means of the upper handle D, which is manipulated or raised in order to grip the bail of the pot by means of one of its series of curved notches 3, formed therein, in conjunction with the lower steadying and rigid handle E.

The forward and outer bent ends of the upper handle D are pivoted to the lugs 4, which are stamped out of the plate C and bent upward to form said lugs. Therefore they are a part of the plate C. The rear edge of this plate is bent upward and forms a flange 6, through which passes the two-ended rod comprising and forming the handle E, the fore parts of which pass underneath the forward bent and pivoted ends of the handle D and passing and extending through the straining-plate at 8 act as pot-holders 10, which materially support the pot when being strained and prevent any possibility of slipping and leaving their proper and designated position, and the straining-plate is strengthened by means of the handle-rods E. It will be observed that these two holders 10 are located sufficiently apart on the circumferential line of the pot and rigid to prevent any possible side derangement or disengagement of the same from the pot.

A very important feature is the construction and formation of the series of curved notches 3, which are formed in a light metallic plate F, which is folded around the double rod of the handle D to bind the same and then brought vertically upward in the center thereof, these curved notches being stamped out of the said vertical upturned part, as seen in Fig. 1 of the drawings. The particular shape of these curved notches 3 holds the bail of the pot very firmly and securely, and the higher the handle D is lifted when straining in order to thoroughly strain the more secure is the bail. This is an important element in the construction thereof. This series of curved notches allows any one of the notches to be used which will suit the lengths of the bails on different pots.

The advantages of this straining device will be evident, there being no danger of scalding the hands or possibility of derangement. Also the attachment to and the detachment from a pot is instantaneous, and when in position the pot may be held or carried almost at any angle or perfectly vertical.

Various changes in the form, proportion, and minor details of this device may be resorted to without departing from the spirit and scope thereof. Hence

What I claim as my invention, and desire to secure by Letters Patent, is—

1. A strainer of the character described comprising an apertured plate to cover the pouring-out part of a pot, an upper handle pivoted to lugs a distance apart and in line on said plate, a plate attached to the upper side of the handle and provided with a series of notches for entrance of the bail of the pot, and a lower handle the rods of which pass through a rear and upper flange of said plate and underneath the pivotal ends of the upper handle, and extending through the outer part of said plate to hold the pot when straining, as described.

2. A strainer consisting of an apertured plate with rear and upper flange and capable of resting on the pouring-out part of a pot, a rear projecting and lower handle the forward ends of which pass through said rear flange and on the plate and a distance apart widening out to the fore part thereof and extending through the plate at right angles thereto as holder for the pot, an upper handle pivoted to lugs formed on a central part of the plate and in line and on the inner sides of the rigid rods of lower handle and in close proximity thereto, the pivotal ends of the upper handle bent outward and extending over and in close position to the rods of lower handle, and the upper handle provided with a series of curved notches for admission of bail of pot, as described.

3. In a pot-strainer a plate having apertures and a rear upper flange formed therefrom and covering the fore straining part of a pot, rods of a rigid handle a distance apart through said flange and widening out to the fore part of the plate and bent downward through said plate sufficiently to engage with outer side of pot, an upper handle, the widened-out ends of which are bent outward over said rigid rods of lower handle, and pivoted to lugs punched out of and bent upward on said plate, the middle part of said upper handle brought together and held by means of a plate folded around the rods thereof and extended upward in the middle and provided with a series of curved notches to hold the bail of the pot, as described.

In witness whereof I have hereunto set my hand in presence of two witnesses.

CHARLES YEAGER.

Witnesses:
JOHN A. HENDRY,
R. E. HERALD.